United States Patent [19]

Rasshofer et al.

[11] Patent Number: 4,469,856
[45] Date of Patent: Sep. 4, 1984

[54] NON-CRYSTALLINE POLYAMINE/CARBONIC ACID SALT COMPOSITIONS, A PROCESS FOR THEIR PREPARATION AND THEIR USE FOR THE PRODUCTION OF POLYURETHANE UREAS, ESPECIALLY FOAMED COATINGS

[75] Inventors: Werner Rasshofer, Cologne; Wilhelm Thoma; Anton Schmitz, both of Leverkusen, all of Fed. Rep. of Germany

[73] Assignee: Bayer Aktiengesellschaft, Leverkusen, Fed. Rep. of Germany

[21] Appl. No.: 434,788

[22] Filed: Oct. 18, 1982

[30] Foreign Application Priority Data

Oct. 31, 1981 [DE] Fed. Rep. of Germany ....... 3143253

[51] Int. Cl.$^3$ .............................................. C08G 18/81
[52] U.S. Cl. ...................................... 528/45; 528/68; 252/182
[58] Field of Search ................... 252/182; 528/68, 45

[56] References Cited

U.S. PATENT DOCUMENTS 2,855,384 10/1958 Lehman et al. ...................... 528/68
3,425,964 2/1969 Stanley .............................. 521/128

FOREIGN PATENT DOCUMENTS

| 838217 | 3/1952 | Fed. Rep. of Germany . |
| 1413484 | 12/1965 | France . |
| 7213068 | 4/1972 | Japan . |
| 50-52175 | 5/1975 | Japan . |
| 1055306 | 1/1967 | United Kingdom . |
| 1283089 | 7/1972 | United Kingdom . |

Primary Examiner—John Kight, III
Assistant Examiner—M. L. Moore
Attorney, Agent, or Firm—Gene Harsh; Joseph C. Gil; Thomas W. Roy

[57] ABSTRACT

This invention relates to new liquid or fluid polyamine/carbonic acid salt compositions free from crystalline content and their preparation from mixtures containing at least one aliphatic or cycloaliphatic polyamine, an aliphatic or cycloaliphatic hydroxyamine having at least one hydroxyl group and at least one amino group, and water and optionally diluents and/or conventional auxiliary agents and additives, by the addition of carbon dioxide. The proportion of polyamine to hydroxyamine is in the range of from about 95:5 to 10:90 % by weight, the quantity of water added is from about 0.01 to 5 mol of $H_2O$ per amine equivalent (but at least 1 mol of water per mol of $CO_2$) and the quantity of $CO_2$ added is from about 0.01 to 0.99 mol of $CO_2$ per amine equivalent. The invention further relates to the use of these liquid polyamine/carbonic acid salt compositions for the production of foamed polyurethane ureas, especially for coating substrates or for the production of sheet products, using prepolymers preferably containing blocked isocyanate groups and the liquid polyamine/carbonic acid salt compositions as chain lengthening agents and/or crosslinking agents and at the same time as physiologically harmless blowing agents.

11 Claims, No Drawings

NON-CRYSTALLINE POLYAMINE/CARBONIC ACID SALT COMPOSITIONS, A PROCESS FOR THEIR PREPARATION AND THEIR USE FOR THE PRODUCTION OF POLYURETHANE UREAS, ESPECIALLY FOAMED COATINGS

BACKGROUND OF THE INVENTION

1. Field of the Invention

This invention relates to new liquid or fluid polyamine/carbonic acid salt compositions free from crystalline content and their preparation from mixtures containing at least one aliphatic or cycloaliphatic polyamine, an aliphatic or cycloaliphatic hydroxyamine having at least one hydroxyl group and at least one amino group, and water, and optionally diluents and/or conventional auxiliary agents and additives, by mixing the aforesaid components with carbon dioxide. The invention further relates to the use of these liquid polyamine/carbonic acid salt compositions for the preparation of polyurethane ureas which are optionally foamed, especially for the coating of substrates or production of sheet products, using isocyanate prepolymers in which the isocyanate groups are preferably blocked and the liquid polyamine/carbonic acid salt compositions as chain lengthening agents and/or crosslinked agents and at the same time as physiologically harmless blowing agents.

2. Description of the Prior Art

It is known to produce carbonates or bicarbonates of amines from the said amines or polyamines, carbon dioxide and water. The products obtained are generally fairly high melting, crystalline compounds which are insoluble or difficultly soluble in the hydroxyl compounds conventionally used for the preparation of polyurethanes. These crystalline carbonic acid salts of the amines, such as, for example, bicarbonates and/or carbonates, optionally with different degrees of hydration, may be reacted with compounds containing isocyanate groups or compounds capable of reacting like isocyanate groups to produce relatively high molecular weight compounds containing urea groups. Thus, U.S. Pat. No. 3,425,964 teaches the hardening of polyurethane resins with solid aminecarbonates which have unlimited stability at 25° C. The said U.S. patent specification also teaches the production of foamed products from the said compounds. JP-A No. 50,052,175 discloses the preparation of molded polyurethane products from a polyurethane reaction mixture with the addition of a (cyclo)-aliphatic diaminecarbonate such as, for example, 1,6-diaminohexanecarbonate at temperatures below the decomposition temperature of the carbonate. To harden the product and fix the form, it is heated above the decomposition point of the amino carbonate.

DBP No. 838,217 describes the preparation of linear polyureas by thermal condensation of diisocyanates and carbonic acid salts of diamines. JP-A No. 7,213,068 teaches the use of amine carbonates for the production of polyurethane foam heat sealing compounds.

In the present state of the art, amine/$CO_2$ adducts (carbamates or carbonates) are only known to be used in the form of crystalline products. These crystalline $CO_2$ adducts must be used in a very finely divided form in order to avoid uneven hardening. In addition, it is necessary to take precautions to prevent the deposition of such dispersed amine/$CO_2$ adducts. Furthermore, it is well known to the man of the art that the cross-linking of compounds containing isocyanate groups with solid substances present in a heterogeneous phase can only be achieved with considerable effort and frequently leads to inferior products since the said solid substances cannot be sufficiently firmly linked and chemically incorporated. The need to use the diamine/$CO_2$ adducts in the form of very finely divided suspensions for their reaction with the polyisocyanates even applies to reactions of crystalline $CO_2$ adducts in highly polar solvents such as dimethylformamide (see DE-B No. 1,223,154).

In French Pat. No. 1,413,484 it has also been disclosed to prepare polyhydrazodicarboxylic acid amides or polyureas containing alcoholic hydroxyl groups in highly polar solvents such as dimethylformamide or dimethylacetamide by reacting solutions of the carbonic acid salts of the diamines containing alcoholic hydroxyl groups, such as N-hydroxyethylhexane-1,6-diamine or 1,3-diamino-propanol-2 with aromatic diisocyanates in solvents at $-20°$ C. to $+30°$ C. In this reaction, the carbonic acid salts are dissolved or suspended in highly polar solvents and are formed in the highly polar solvents, optionally with the addition of hydroxydiamines and optionally also diamines or hydrazines not containing hydroxyl groups. If, however, diamines without hydroxyl groups (e.g., ethylene diamine) are added, insoluble, crystalline amine salts separate. Reaction of the amine salts with the polyisocyanates forms solutions from which hard, homogeneous polyureas are obtained by evaporation of solvent.

It was, therefore, an object of the present invention to avoid the disadvantages known in the art of using crystalline aminecarbonates as chain lengthening agents and enable amine carbonate reactions to be carried out without highly polar solvents. It was also an object of the present invention to provide non-crystalline compositions containing carbonates and/or bicarbonates of aliphatic and/or cycloaliphatic primary or secondary polyamines, preferably primary diamines. It was also an object of the invention to provide high proportions of cycloaliphatic primary diamines in liquid form as an amine/carbonic acid salt mixture. It was yet a further object of the present invention to provide a process for the preparation of foamed sheet products from polyurethane ureas, using physiologically harmless products as blowing agents. The invention also seeks to provide an easily workable liquid non-crystalline mixture which will act both as chain lengthening agent or cross-linking agent and as blowing agent donor in the formation of polyurethanes, the carbon dioxide functioning as inert, physiologically harmless blowing agent.

It has now surprisingly been found that carbonic acid salts (carbonates and/or bicarbonates) of mixtures of (1) aliphatic and/or cycloaliphatic polyamines, preferably diamines having primary and/or secondary amino groups and (2) hydroxyamines to be defined in more detail below, preferably (poly)amines containing hydroxyalkyl groups, optionally in the presence of additional quantities of water and optionally certain solvents as diluents do not crystallize but exist in a liquid or pasty fluid state.

These carbonic acid salt mixtures are characterized by the absence of crystalline components. It has also surprisingly been found that solvents which are normally non-solvents for bicarbonates or carbonates may be added to the adduct mixtures before, during or after formation of the mixed carbonic acid salts according to the invention to lower the viscosity without causing precipitation of the carbonic acid salt components. Preferably, only a portion of the amino groups in the mixture is converted into carbonic acid salts with carbon dioxide.

SUMMARY OF THE INVENTION

The present invention relates to non-crystalline, liquid or fluid polyamine/carbonic acid salt compositions of polyamines and $CO_2$, characterized in that they contain
(1) aliphatic or cycloaliphatic polyamines having primary and/or secondary amino groups (preferably primary amino groups), preferably polyamines having 2 to 4 amino groups, most preferably primary diamines, especially cycloaliphatic diamines, and
(2) aliphatic or cycloaliphatic hydroxypolyamines having at least one hydroxyl group and at least one amino group (preferably mono- to tris-hydroxyalkylpolyamines, most preferably mono- and bis-hydroxyalkyl-alkylene diamines),
components (1):(2) being present in proportions in the range of from about 95:5 to 10:90% by weight (preferably from about 80:20 to 25:75% by weight, most preferably from about 65:35 to 30:70% by weight),
(3) optionally diluents in the form of organic solvents having a boiling point below about 160° C. and being at least partially soluble in water, in quantities of up to about 90% by weight of diluent (preferably up to about 60% by weight, most preferably up to about 30% by weight) in the total mixture of (1) to (6),
(4) optionally further known auxiliary agents and additives,
(5) from about 0.01 mol to 5 mol (preferably from about 0.1 to 1.0 mol, most preferably from about 0.15 to 0.7 mol) of water per amine equivalent, but at least 1 mol of water per mol of carbon dioxide, and
(6) about 0.01 to 0.99 mol of $CO_2$ per amine equivalent (preferably from about 0.05 to 0.80 mol, most preferably from about 0.1 to 0.5 mol).

This invention also relates to a process for the preparation of non-crystalline, liquid or fluid polyamine-carbonic acid salt compositions from polyamines and carbon dioxide, which comprises mixing
(1) aliphatic or cycloaliphatic polyamines containing primary and/or secondary amino groups (preferably primary amino groups), preferably polyamines having from 2 to 4 amino groups, most preferably primary diamines, especially primary cycloaliphatic diamines, and
(2) aliphatic or cycloaliphatic hydroxypolyamines having at least one hydroxyl group and at least one amino group (preferably mono- to tris-hydroxyalkylpolyamines, most preferably mono- and dihydroxyalkyl-alkylene diamines) in proportions of (1):(2) of from about 95:5 to 10:90% by weight (preferably from about 80:20 to 25:75% by weight, most preferably from about 65:35 to 30:70% by weight) optionally in the presence of
(3) diluents in the form of organic solvents which have a boiling point below about 160° C. (preferably below about 146° C.) and are at least partially soluble in water, in quantities of up to about 90% by weight of diluent (preferably from about 0 to 60% by weight, most preferably from about 0 to 30% by weight), in the total mixture of (1) to (6), optionally adding
(4) further known auxiliary agents and additives and further mixing
(5) water, the quantity of water being from about 0.01 to 5 mol (preferably from about 0.1 to 1.0 mol, most preferably from about 0.15 to 0.7 mol) of water per amine equivalent and at least 1 mol of water per mol of carbon dioxide, and
(6) sufficient carbon dioxide so that the quantity of incorporated $CO_2$ per amine equivalent is from about 0.01 to 0.99 mol of $CO_2$ (preferably from about 0.05 to 0.80 mol, most preferably from about 0.1 to 0.5 mol).

The invention also relates to the use of the non-crystalline polyamine/carbonic acid salt compositions for the preparation of polyurethane ureas which are optionally foamed, preferably for the production of optionally foamed coatings on textiles, non-woven webs, leather-like or other substrates, from
(A) isocyanate prepolymers containing an average of 2 to 4 optionally blocked aromatic and/or aliphatic and/or cycloaliphatic isocyanate groups, having an isocyanate content of from about 1 to 24% by weight (preferably from about 1.7 to 6% by weight),
(B) chain lengthening agents and/or cross-linking agents, and optionally
(C) known auxiliary agents and additives and solvents, characterized in that component (B) comprises at least 50 equivalent percent (preferably at least 75%), most preferably 100% of the non-crystalline, liquid or fluid polyamine/carbonic acid salt compositions according to the invention with up to 50 equivalent percent, if desired, of conventional chain lengthening agents or cross-linking agents.

If desired, the polyamine/carbonic acid salt compositions may be restricted to smaller quantities, e.g. about 20–50 equivalent % used with about 80 to 50 equivalent % of conventional chain lengthening agents, but this is less advantageous.

DETAILED DESCRIPTION OF THE INVENTION

The following compounds are examples of suitable polyamine components (1): Linear or branch chained aliphatic diamines containing primary amino groups, e.g. 1,2-diaminoethane, 1,2-diaminopropane, 1,3-diaminopropane, 1,4-diaminobutane, 1,5-diaminopentane, 1,6-diaminohexane, 2,2,4-trimethyl-1,6-diaminohexane, 1,7-diaminoheptane, 1,8-diaminooctane, 1,10-diaminodecane, 1,11-diaminoundecane, 1,12-diaminododecane; or diamines containing hetero atoms, such as 1,5-diamino-3-oxapentane, 1,8-diamino-3,6-dioxa-octane, 1,11-diamino-3,6,9-trioxa-undecane, 1,13-diamino-4,9-dioxa-tridecane, and 1,9-diamino-5-oxa-nonane.

The following are preferred:
cycloaliphatic diamines having 2 primary amino groups, such as 5-amino-2,2,4-trimethyl-1-cyclopentane-methylamine, 5-amino-1-aminomethyl-1,3,3-trimethyl-cyclohexane (isophorone diamine), 1,4-diaminocyclohexane, 1,3-diaminocyclohexane, 1,8-diamino-p-menthane, 1-methyl-2,6-diaminocyclohexane, 1-methyl-2,4-diaminocyclohexane, 4,4'-diaminodicyclohexylmethane and its 2,4'- and 2,2'-isomers, 4,4'-diamino-3,3'-dimethyl-dicyclohexylmethane and its 2,4'- and 2,2'-diaminoisomers, 4,4'-diamino-dicyclohexylethane, 4,4'-diaminodicyclohexylether, bis-(4'-aminocyclohexyl)-propane-(2,2), 4,4'-diamino-dicyclohexane, 4,4'-diamino-3,3'-diethyl-dicyclohexylmethane, 1,1-di-(4'-aminocyclohexyl)-cyclohexane, 1,1-di-(4'-amino-3'-methylcyclohexyl)-cyclohexane, 4,4'-diamino-3,5-diethyl-3',5'-diisopropyldicyclohexylmethane, and 4,4'-diamino-3,3',5,5'-tetraethyl-dicyclohexylmethane in all the conformers and any mixtures of conformers of the cycloaliphatic diamines.

Di- and polyamines containing tertiary amino groups may also be used, e.g. bis-(3-aminopropyl)-methylamine, N,N'-bis-(2-aminoethyl)-piperazine and N,N'-bis-(3-aminopropyl)-piperazine.

Diamines having secondary amino groups may also be used although they are less preferred as sole components. Examples include N-methyl-ethylenediamine, N,N'-diethyl-ethylenediamine, N,N'-dibutyl-hexamethylenediamine, piperazine and 2,5-dimethyl-piperazine. Hydrazine, hydrazine hydrate and N,N'-diaminopiperazine are also suitable. Compounds having 3 or 4 or even more primary and/or secondary amino groups may also be used, e.g. 1,6,11-triaminoundecane, 1,5-diamino-3-azapentane, 1,8-diamino-3,6-diazaoctane, 1,11-diamino-3,6,9-triazaundecane, 1,14-diamino-3,6,9,12-tetraazatetradecane, 1,7-diamino-4-aza-heptane, 1,11-diamino-4,8-diaza-undecane, 1,13-diamino-4,10-diaza-7-methyl-7-aza-tri-decane and 1,3,5-triamino-cyclohexane.

Monoamines such as methylamine, ethylamine, propylamine, isopropylamine, n-butylamine, isobutylamine or tertiary-butylamine, cyclopentylamine, cyclohexylamine or piperidine or N,N-dimethylhydrazine may also be used in minor quantities (less than about 5 mol %) in addition to the polyamines.

In the process according to the invention, it is preferred to use aliphatic diamines such as ethylenediamine and 1,6-diaminohexane, and especially cycloaliphatic diamines such as 4,4'-diamino-3,3'-($C_1$-$C_4$-alkyl)-dicyclohexylmethane compounds and 4,4'-diamino-3,3',5,5'-tetra-($C_1$-$C_4$-alkyl)-dicyclohexylmethane compounds such as 4,4'-diamino-3,3'-dimethyl-dicyclohexylmethane, 4,4'-diamino-3,3'-diethyl-dicyclohexylmethane, 4,4'-diamino-3,3',5,5'-tetraethyl-(or tetraisopropyl)-dicyclohexylmethane, 4,4'-diamino-3,5-diethyl-3',5'-diisopropyl-dicyclohexylmethane and 5-amino-1-aminomethyl-1,3,3-trimethyl-cyclohexane.

The aliphatic or cycloaliphatic hydroxyamines used (Component 2) may be compounds containing at least one primary, secondary or tertiary hydroxyl group and at least one primary, secondary or tertiary amino group. Hydroxyamines having at least one hydroxyl group and at least two primary and/or secondary amino groups are preferred. Mono- to tris-hydroxyalkyl-polyamines are preferably used, and particularly mono- and di-hydroxyalkyl-alkylenediamines.

The following are examples:
Monoalkoxylated diamines derived from aliphatic straight chained or branched chained diamines, preferably with 2 to 12 carbon atoms, or optionally alkyl-substituted cycloaliphatic diamines of the cyclohexane, dicyclohexyl, dicyclohexylmethane, dicyclohexyl-2,2-propane and dicyclohexyl-1,1-cyclohexane series and alkylene oxides such as ethylene oxide, propylene oxide, butylene-2,3-oxide or styrene oxide. Monoalkoxylated aliphatic diamines with 2 to 6 C-atoms and in some cases cycloaliphatic diamines which have been alkoxylated with ethylene oxide or propylene oxide are preferred. The following are examples: N-($\beta$-hydroxyethyl)-ethylenediamine, N-($\beta$-hydroxyethyl)-propylene-1,2-diamine, N-($\beta$-hydroxyethyl)-propane-1,3-diamine, N-($\beta$-hydroxyethyl)-hexane-1,6-diamine, N-($\beta$-hydroxyethyl)-dodecane-1,12-diamine, N-($\beta$-hydroxypropyl)-ethylenediamine, N-($\beta$-hydroxypropyl)-propylene-1,2-diamine, N-($\beta$-hydroxypropyl)-propane-1,3-diamine, N-($\beta$-hydroxypropyl)-butane-1,4-diamine, N-($\beta$-hydroxybutyl)-ethylene diamine, N-($\beta$-hydroxybutyl)-hexane-1,6-diamine, N-($\beta$-hydroxyethyl)-xylylene-1,3-diamine, N-($\beta$-hydroxyethyl)-cyclohexane-1,3- or 1,4-diamine, N-($\beta$-hydroxyethyl)-2,2,4-trimethyl-hexane-1,6-diamine, 1-methyl-2-amino-4-[N-(2-hydroxyethyl)-amino]-cyclohexane, N-($\beta$-hydroxyethyl)-isophoronediamine, and N-($\beta$-hydroxyethyl)-4-aza-4-methyl-heptane-1,7-diamine. Also suitable are the bis-(hydroxyalkyl)-diamines obtained from the corresponding straight chained or branch chained aliphatic or cycloaliphatic diamines by alkoxylation with alkylene oxides, preferably with ethylene oxide and/or propylene oxide. Examples include N,N'-bis-($\beta$-hydroxyethyl)-ethylenediamine, N,N'-bis-($\beta$-hydroxypropyl)-ethylenediamine, N,N',-bis-($\beta$-hydroxyethyl)-propylene-1,2-diamine, N,N'-bis-($\beta$-hydroxypropyl)-propane-1,3-diamine, N,N'-bis-($\beta$-hydroxyethyl)-1-methyl-2,4- or -2,6-diaminocyclohexane, N,N'-bis-($\beta$-hydroxypropyl)-1-methyl-2,6- or -2,4-diaminocyclohexane, N,N'-bis-($\beta$-hydroxyethyl)-isophoronediamine, N,N'-bis-($\beta$-hydroxypropyl)-p-xylylene diamine, and N-($\beta$-hydroxyethyl)-N'-($\beta$-hydroxypropyl)-ethylenediamine. Alkoxylated triamines and polyamines may also be used, e.g. tris-($\beta$-hydroxyethyl)-1,6,11-triaminoundecane. Mixtures of compounds at various stages of alkoxylation may also be used, e.g. mixtures of mono-, bis- and tris-hydroxyethyl-ethylenediamine.

Compounds such as 1,3-diamino-propanol-2, 1,6-diamino-hexanol-2, 1,5-diaminopentanol-3, 3,4-diamino-2,2-dimethylbutanol-1, the various diaminocyclohexanols and 1,11-diaminoundecanol-6 may also be used as hydroxyamines.

$\beta$-Hydroxyethylhydrazine and $\beta$-hydroxypropylhydrazine are suitable. The compounds and classes of compounds mentioned above which have two amino functions (primary, secondary or primary and secondary amino groups) are preferred since they react as diamines in the chain lengthening reaction with isocyanate compounds or isocyanate prepolymers (preferably containing blocked isocyanate groups). Among these components, $C_2$-$C_6$-alkylene diamines having $\beta$-hydroxyethyl and/or $\beta$-hydroxypropyl groups are particularly preferred, especially $\beta$-hydroxyethyl- and $\beta$-hydroxypropyl-mono- and -bis-ethylenediamines. $\beta$-hydroxyethyl-ethylenediamine is a particularly preferred compound.

Under certain conditions, monoamino-monohydroxyl or -dihydroxyl compounds (containing primary or secondary amino groups) may also be used, e.g. 2-aminoethanol, 2-methyl-2-aminoethanol, 2-ethyl-2-aminoethanol, 6-methyl-3-oxa-6-aza-hexanol, and 6-hydroxy-hexylamine; also bis-hydroxyalkyl derivatives of primary amines, e.g. bis-($\beta$-hydroxyethyl)-amine, $\beta$-hydroxyethyl-oleylamine, ($\beta$-hydroxypropyl)-amine, or N,N,N'-tris($\beta$-hydroxypropyl)-ethylenediamine. Compounds such as 3-aminomethyl-3,5,5-trimethyl-cyclohexanol, 2-amino-2-hydroxymethyl-1,3-propanediol, 2-amino-2-methyl-1,3-propanediol and 2-amino-2-methylpropanol may also be used.

These monoaminohydroxyl compounds are less preferred since in a reaction with isocyanate prepolymers containing blocked isocyanate groups they react substantially with the amino group alone, i.e. as monofunctional compounds. They should, therefore, only be used in minor quantities (less than about 5% by weight) for these reactions since they function as chain breaking agents. However, when used with isocyanate prepolymers which are not blocked, they behave as polyfunctional compounds in their reactions with amino and hydroxyl groups.

Compounds containing one, preferably several hydroxyl groups and tertiary amino groups are also suitable as hydroxyamines. These include, for example, triethanolamine, tris-($\beta$-hydroxypropyl)-amine, tetra-($\beta$-hydroxyethyl)-ethylenediamine, tetra-($\beta$-hydroxypropyl)-ethylenediamine, tetra-($\beta$-hydroxyethyl)-isophorone diamine or di($\beta$-hydroxyethyl)-methylamine, di-($\beta$-hydroxyethyl)-butylamine or di($\beta$-hydroxypropyl)ethylamine or bis-($\beta$-hydroxypropyl)-methylamine, bis-($\beta$-hydroxypropyl)-hexylamine.

In their reaction with isocyanate compounds which are not blocked, these t-amino-polyols function as polyol chain lengthening agents but they react too slowly with blocked isocyanate groups in isocyanate prepolymers at the usual reaction temperatures. In the latter case, they do not function as chain lengthening agents or cross-linking agents but as catalysts or additives.

Suitable for use as diluent component (3) are organic solvents which are at least partially soluble in water and have a boiling point below about 160° C., preferably below about 146° C. For example, there may be used alcohols such as methanol, ethanol, n-propanol, iso-propanol, n-butanol, sec.-butanol, tert.-butanol or iso-amyl alcohol; ether glycols such as ethylene glycol monomethyl ether and ethylene glycol monoethyl ether; ether esters such as ethylene glycol-monomethyl ether acetate and ethylene glycol-monoethyl ether acetate; ethers such as tetrahydrofuran, dimethoxy-ethane or dioxane and esters such as ethyl formate, ethyl acetate and methyl propionate.

Ketones such as acetone, methyl ethyl ketone and methyl isobutylketone are less preferred since they are liable to undergo reactions with the (primary) amines. Solvents containing amide, urea or sulphone groups, such as dimethylformamide, dimethylacetamide, N-methyl-pyrrolidone, tetramethylurea or tetramethylenesulphone are not used or at the most may be added in quantities of up to about 10% by weight to the given solvents.

Suitable auxiliary agents and additives (4) include, for example, emulsifiers, antifoaming agents, pigments, dyes, plasticizers, etc. and in general also the types of additives employed when the compositions according to the invention are used as cross-linking components in heat hardening coating compositions, e.g. stabilizers, diluents, substances to improve the flow properties, cell regulators, catalysts, reaction retarders, flame retarding agents and other additives used in the usual quantities (see DE-A No. 2,854,384, pages 25 to 32).

The process according to the invention for preparing the polyamine/carbonic acid compositions is generally carried out by introducing a mixture of components (1) and (2) in proportions by weight in the range of about 95:5 to 10:90 or in the preferred ratios already indicated above into a suitable vessel equipped with stirrer. Slight to moderate heating usually occurs when components (1) and (2) are brought together.

The addition of water may be carried out by adding from about 0.01 to 5 mol of water per equivalent of basic nitrogen atoms (preferably from about 0.1 to 1.0 mol of water, most preferably from about 0.15 to 0.7 mol of water) to the mixture of components (1) and (2). Also possible although less preferred in practice is the addition of the finished mixture of (1) and (2) to the given quantity of water or mixing of the quantity of water with one of the components (1) or (2), followed by addition of the other component. The water may also be mixed with only a proportion of (1) or (2) or of mixtures of (1) and (2) and the resulting mixture may subsequently be combined with the remaining quantities of (1) or (2) or of mixtures of (1) and (2). The addition of water in any of the variations indicated above is accompanied by the evolution of heat. The carbon dioxide (6) may be added in the form of gaseous or solid carbon dioxide. Preferably, gaseous carbon dioxide is introduced into or passed over a previously prepared mixture of (1), (2) and water (and optionally also diluent (3) and additives (4)). In the course of about 5 minutes to 30 hours, preferably within a period of about 30 minutes to 6 hours, gaseous carbon dioxide is supplied in the quantity required to enable the mixture to take up from about 0.01 to 0.99 mol, preferably from about 0.05 to 0.8 mol, most preferably from about 0.1 to 0.5 mol of carbon dioxide per amine equivalent. This is under the assumption that the mixture of (1), (2) and water (and optionally further additives (3) and (4)) contains at least sufficient water to ensure that only salts of carbonic acid will form (carbonates or bicarbonates) and not salts of carbamic acid (carbamates), i.e. that at least one mol of water is present per mol of $CO_2$ supplied. The amine mixtures preferably continues to be gassed with carbon dioxide until saturation is reached, i.e. until no further carbon dioxide is taken up at any appreciable velocity. This saturation limit is generally below the quantity which can theoretically be absorbed, based on all the NH equivalents present.

The compositions obtained from polyamine (1), hydroxyamine (2), water, carbon dioxide and, optionally additives, normally have a carbon dioxide content of from about 0.1 to 25% by weight, preferably from about 2 to 10% by weight.

The quantity of chemically bound carbon dioxide present may be demonstrated by removing a specified quantity of sample, subjecting it to a vacuum, optionally with simultaneous introduction of a stream of inert gas such as nitrogen, and adding acid, e.g. acetic acid, formic acid, hydrochloric acid or sulphuric acid. The quantity by weight of chemically bound carbon dioxide may be calculated from the volume of carbon dioxide formed, for example, by means of the general gas equation. The $CO_2$ liberated may also be determined gravimetrically as $BaCO_3$.

Components (3) and (4) may be added before, during or after the reaction with carbon dioxide. Component (3) is preferably added after the treatment with carbon dioxide gas while component (4) is preferably added before this treatment. If component (3) is added before the carbon dioxide, it may be added either to the mixture of (1)+(2) or to the mixture of (1)+(2)+water or to the mixture of (1)+water or (2)+water.

Diluent component (3) may be added, for example, with stirring at about 15° to 80° C., preferably at about 25° to 60° C. This may be carried out immediately or at any time up to about 12 hours, preferably about 30 minutes to 6 hours after the addition of $CO_2$ has been terminated. It should be pointed out again that when used without component (2), these diluents lead to the formation of crystalline carbonic acid salts. The quantity of component (3) based on the total weight of the components is from about 0 to 90% by weight, preferably up to about 60% by weight, most preferably up to about 30% by weight. Final adjustment of the mixture of the polyamine/carbonic acid salt compositions may also be carried out by subsequently mixing a polyamine/carbonic acid salt mixture with further polyamines, hydroxyamines, portions of water or mixtures of these components, optionally together with further diluent.

The polyamine/carbonic acid compositions prepared according to the invention and having the composition according to the invention may be used for the synthesis of polyurethane ureas, preferably by a reaction with isocyanate prepolymers based on excess quantities of polyisocyanates and relatively high molecular weight polyols and/or low molecular weight polyols and optionally further chain lengthening agents.

The isocyanates used for the synthesis of the isocyanate prepolymers optionally containing blocked isocyanate groups (component A of the polyurethane starting materials) are preferably aromatic but may also be aliphatic and/or cycloaliphatic polyisocyanates, such as those described in some detail in U.S. Pat. Nos. 3,984,607, 4,331,778 and 4,035,213 (all of which are herein incorporated by reference), DE-A No. 2,402,840, DE-B No. 2,457,387 and DE-A No. 2,854,384. The following are preferred according to the invention: 4,4'- and/or 2,4'-diisocyanatodiphenylmethane, the isomeric tolylene diisocyanates and their commercial mixtures or modification products, 3,3'-dimethyl-4,4'-diisocyanatodicyclohexylmethane, 4,4'-diisocyanatodicyclohexylmethane, 1,6-hexanediisocyanate, isophorone diisocyanate and mixtures of these diisocyanates.

For the preparation of the isocyanate prepolymers, these polyisocyanates may be reacted with relatively high molecular weight polyhydroxyl compounds containing from 2 to 8, preferably 2 or 3 hydroxyl groups and having a molecular weight of about 500 to 10,000, preferably from about 1000 to 6000, as also described in detail in the above-mentioned publications. According to the invention it is preferred to use propylene oxide polyethers having an average of 2 to 3 hydroxyl groups which may also contain polyethylene oxide units and polyethylene oxide sequences as well as hydroxypolyesters with melting points below about 60° C. which contain from 2 to 3 terminal end groups and have an average molecular weight of from about 1000 to 6000. Mixtures of the above-mentioned hydroxypolyethers with hydroxypolyesters of adipic acid, hexane-1,6-diol and neopentyl glycol having an average molecular weight of from about 1000 to 3000, esters based on hexanediol polycarbonates and mixtures thereof with polyesters are preferred according to the invention.

Low molecular weight polyols having a molecular weight of less than about 399, preferably less than about 300, of the kind known as chain lengthening agents, may also be used for the preparation of the isocyanate prepolymers. According to the invention, the chain lengthening agents are preferably used in a molar ratio to the relatively high molecular weight polyhydroxyl compounds of up to about 15:1, preferably about 6:1. Preferred compounds include butane-1,4-diol, trimethylolpropane, pentaerythritol, hydroquinone-bis-hydroxyethylethers and bis-(hydroxyalkyl)-ether of 4,4'-bis-(hydroxyphenyl)-propane. Other suitable low molecular weight polyols have been described in DE-A No. 2,854,384.

Excess polyisocyanates may also be reacted with the low molecular weight polyols alone, e.g. trimethylolpropane may be reacted with excess diphenylmethane-4,4'-diisocyanate to form an isocyanate prepolymer having an isocyanate content of about 24% by weight. In these cases, however, the polyurethane forming reaction mixture preferably also contains relatively high molecular weight polyols.

Preparation of the isocyanate prepolymers is carried out in known manner by reacting the above-mentioned polyhydroxyl compounds with excess diisocyanates, preferably at about 70° to 110° C. The NCO/OH ratio used is generally in the range of from about 1.5:1 to 10:1, preferably from about 1.7:1 to 2.5:1. The weight proportion of isocyanate groups in the prepolymer is then in the region of about 1.0 to 24% NCO, preferably from about 1.7 to 4.5% NCO.

The blocking agents used for the isocyanate prepolymers may be phenols, tertiary alcohols, oximes, β-dicarbonyl compounds, lactams, benzotriazoles et al.

These and other blocking agents have been described by Z. W. Wicks, Jr., Progress, in Org. Coatings 3, 73–99 (1975); G. R. Griffin and L. J. Willwerth in Ind. Eng. Chem., Prod. Res. and Develop. I, 265–268 (1962); A. Damusis and K. C. Frisch in Film-Forming Compositions, Part I, Marcel Dekker, New York, 1967 and S. W. Wong, A. Damusis, K. C. Frisch, R. L. Jacobs and J. W. Long in J. Elast. Plast. 11, 15–36 (1979). Preferred blocking agents are ketoximes of hydroxylamine and ketones such as acetone, methyl ethyl ketone, diethylketone, cyclohexanone, acetophenone and benzophenone. Methyl ethyl ketoxime (butanone oxime) is particularly preferred as blocking agent.

The blocked isocyanate prepolymers may be mixed with organic solvents to adjust them to the optimum operating viscosity of from about 20 to 40,000 mPas at 20° C., the solvents being preferably used in quantities of up to about 15% by weight, most preferably up to about 10% by weight, based on the blocked isocyanate prepolymer. Since the isocyanate groups are blocked, the solvents used need not necessarily be inert towards isocyanate groups. Examples of suitable solvents include isopropanol, ethylene glycol monomethyl ether and ethylene glycol monoethyl ether and their acetic acid esters, methyl ethyl ketone, cyclohexanone, butyl acetate and dimethylformamide.

According to the invention, the composition containing polyamine/carbonic acid salts is used as cross-linking component B for the optionally blocked isocyanate prepolymers, as already described above. The polyamine (1) used within the composition is most preferably a 3,3'-dialkyl derivative of 4,4'-diamino-dicyclohexylmethane, in particular 4,4'-diamino-3,3'-dimethyl-dicyclohexyl-methane. The compounds used as hydroxyamine (2) are preferably 2-hydroxyalkylamines (2-hydroxyethyl- and 2-hydroxypropyl-amines), with N-(β-hydroxyethyl)-ethylene diamine being particularly preferred. The blocked isocyanate prepolymers are generally mixed with the polyamine/carbonic acid salt cross-linking composition in equal proportions of the equivalent weights of the components although less than complete cross-linking may be suitable for certain purposes, in which case the equivalent ratio of (blocked) isocyanate groups to primary and/or secondary amino groups is generally, according to the invention, in the range of from about 1.35:1 to 0.95:1, preferably from about 1.25:1 to 1:1. It should be emphasized here that for the reaction of the blocked isocyanate prepolymers, the hydroxyl groups of component (2) are not included in the calculation of equivalents since they generally do not react with the blocked isocyanate groups under the reaction conditions.

The chain lengthening agent and/or cross-linking component (B) preferably exclusively contains the diamine/$CO_2$ composition according to the invention although up to about 50 equivalents percent of component (B) may comprise conventional chain lengthening agents and/or cross-linking agents, e.g. aromatic di- and polyamines or hydrazide compounds such as 4,4'-diaminodiphenylmethane or 3,3',5,5'-tetraalkyl-4,4'-diaminodiphenylmethane such as 3,3',5,5'-tetraethyl-4,4'-diaminodiphenylmethane or 3,5-diethyl-3',5'-diisopropyl-4,4'-diaminodiphenylmethane. Other suitable chain lengthening agents have been described, e.g. in DE-A No. 2,854,384.

Known additives such as catalysts, etc. may, of course, also be added in the usual quantities to the reactive mixtures ready for use (isocyanate prepolymers plus cross-linking agents) or to their starting materials. Suitable compounds have been listed, for example, in DE-A No. 2,854,384.

Since carbon dioxide is liberated as blowing agent in the reaction of the polyamine/carbonic acid salt composition according to the invention to produce polyurethane ureas, the polyurethane ureas obtained are generally foamed products with a density generally amounting to about 25 to 90% of that of the unfoamed polyurethane compositions. Foaming may, if desired, be prevented or reduced by the application of pressure. These reactive mixtures with their retarded reactivity combined with the expanding or blowing reaction are, therefore, particularly suitable for direct and reversal coating on substrates such as woven and knitted fabrics, non-woven webs or natural or synthetic leather, at least one layer of the coating being produced as top coat, bonding coat and/or intermediate coat from the heat hardening reactive compositions described above. The build-up of the various layers may also be combined with the use of the usual one coat or two coat component polyurethanes known in the art.

The procedure generally entails first applying the top coat (preferably a paste of the reactive composition according to the invention or a conventional formulation) in a thickness corresponding to about 20 to 80 g/m² to an intermediate support, e.g. a steel strip, a silicone matrix, a separating paper or the like, drying it in a drying channel, applying the bonding coat (optionally preceded by an intermediate coat) to the dried top coat in a thickness of about 30 to 100 g/m², laminating the substrate thereto and then heating the coating in another drying channel at about 120° to 190° C., preferably about 140° to 170° C. for a few minutes and then removing the coated substrate from the separating support. The substrates used may be textile webs such as woven or knitted fabrics, non-woven webs or leather, split leather or leather fiber materials. When leather is used as substrate, the drying temperatures employed for the bonding coat are about 60° to 110° C., preferably about 80° to 90° C. in order not to damage the leather substrate.

As already mentioned above, the coating paste obtained from the compositions according to the invention may also be applied directly, e.g. to the textile substrate, by the direct spread coating process.

The usual apparatus known in the art, such as roller applicators, rubber cloth wipers, reverse roll coaters, etc. are used for applying the reactive pastes by the transfer coating or the direct coating process. For highly concentrated spread coating pastes, the modern techniques of screen printing and engraved roller printing are also particularly advantageous.

Materials coated with polyurethane ureas by the process according to the invention are suitable for the manufacture of shoe upper material and lining material, heavy duty work clothing, luggage material and the like, upholstery material and as substrates for direct coated articles such as tarpaulins and conveyor belts, etc. and especially for clothing purposes. They have an exceptionally soft handle and advantageous folding and bending properties.

The amine/carbonic acid salt compositions according to the invention may, of course, also be reacted with isocyanate compounds in which the isocyanate groups are not blocked. In this case, they are added to the components containing compounds with isocyanate reactive hydrogen atoms in quantities generally providing an equivalent ratio of NCO to isocyanate reactive groups in the range of from about 1.35:1 to 0.80:1, preferably of from 1.35:1 to 0.95:1.

For the production of foams, for example, the mixture of polyamine/carbonic acid salt compositions with catalysts and optionally other auxiliary agents and diluents may be mixed with the isocyanate prepolymers, optionally in continuously operating dosing and mixing apparatus.

EXAMPLES

EXAMPLES OF PREPARATION

Quantities indicated in the following Examples are parts by weight or percentages by weight unless otherwise stated.

EXAMPLE 1

800 g of 3,3'-dimethyl-4,4'-diamino-dicyclohexylmethane (3.36 mol), 875 g of N-($\beta$-hydroxyethyl)-ethylene diamine (8.41 mol), 212 g of water (11.8 mol) and 1.3 l of methanol are introduced into a reaction vessel. While the reaction temperature is maintained at 30° to 40° C. by external cooling with an ice bath, carbon dioxide is introduced until no further absorption of $CO_2$ is observed. When methanol has been completely removed at 18 mbar/70° C., the paste, which is thick at room temperature, is diluted at 20° C. with a mixture of 2490 g of 3,3'-diamino-4,4'-dimethyl-dicyclohexylmethane (10.46 mol), 1098 g of N-($\beta$-hydroxyethyl)-ethylenediamine (10.56 mol) and 133.6 g of water (7.42 mol).

The polyamine/carbonic acid salt composition, which is thixotropic at room temperature and readily fluid at 50° C., does not become thick at room temperature even after a storage time of over 6 months, shows no crystalline components and releases 1.5 l of carbon dioxide from 50 g of the composition after the addition of excess 50% sulphuric acid.

EXAMPLE 2

1178 g of 3,3'-dimethyl-4,4'-diamino-dicyclohexylmethane (4.95 mol), 705 g of N-($\beta$-hydroxyethyl)ethylene diamine (6.78 mol), 123 g of water (6.83 mol) and 200 g of glycol monoethyl ether are introduced into a reaction vessel. 77.1 l (3.44 mol) of carbon dioxide are taken up within 20 minutes at a temperature rising from 40° C. to 62° C. Immediately after the introduction of $CO_2$ has been terminated, the reaction mixture is diluted with 385 g of glycol monoethyl ether. After the mixture has been left to stand for 40 minutes, it thickens to a paste. The thixotropic product mixture releases 1.4 l of $CO_2$ from 50 g of mixture when excess 50% sulphuric acid is added.

EXAMPLE 3

1178 g of 3,3'-dimethyl-4,4'-diamino-dicyclohexylmethane (4.95 mol), 705 g of N-(β-hydroxyethyl)ethylene diamine (6,78 mol) and 123 g of water (6.83 mol) are introduced into a reaction vessel. 76 l (3.39 mol) of $CO_2$ are taken up within 20 minutes at a temperature rising from 40° C. to 62° C. The mixture which has thickened to a paste after one day is heated to 50° C. and diluted with 585 g of glycol monoethylether. 50 g of the total mixture yields 1.4 l of carbon dioxide after the addition of excess 50% sulphuric acid. The product mixture prepared as described above is more fluid at every temperature than the products according to Examples 1 and 2. It does not thicken after 6 months storage, shows no crystalline deposits and is phase stable.

EXAMPLE 4

1178 g of 3,3'-dimethyl-4,4'-diamino-dicyclohexylmethane (4.95 mol), 705 g of N-(β-hydroxyethyl)ethylene diamine (6.78 mol), 123 g of water (6.83 mol) and 199 g of glycol monoethylether are introduced into a reaction vessel. 76 l (3.39 mol) of carbon dioxide are taken up within 90 minutes. When the mixture has been left to stand for 6 hours, it is diluted at 40° C. with 386 g of glycol monoethylether. The composition, which is stiff and thixotropic at room temperature and fluid at 50° C., is a homogeneous monophasic mixture without crystalline components even after 6 months storage.

EXAMPLE 5

326 g of a mixture of 80% of 1-methyl-2,4-diaminocyclohexane and 20% of 1-methyl-2,6-diaminocyclohexane (2.55 mol), 163 g of N-(β-hydroxyethyl)-ethylenediamine (1,57 mol) and 63.9 g (3.55 mol) of water are introduced into a reactor. 34.6 l (1.54 mol) of carbon dioxide are taken up within 45 minutes, the temperature rising to 75° C. in the process. The resulting reaction mixture is a clear solution having a viscosity at 20° C. of 15,000 mPas. No rise in viscosity or separation of crystalline components or phase separation can be observed even after 6 months storage of the composition.

EXAMPLE 6

258 g of isophorone diamine (1.52 mol), 214 g of diethanolamine (2.04 mol) and 37.6 g of water (2.09 mol) are introduced into a reaction vessel and carbon dioxide is passed in. 24.9 l of carbon dioxide (1.11 mol) are taken up in the course of one hour, during which the reaction temperature rises to 82° C. A highly viscous, thixotropic paste without crystalline components is obtained on cooling.

EXAMPLE 7

286 g of isophorone diamine (1.68 mol), 191 g of triethanolamine (1.28 mol) and 41.8 g of water (2.32 mol) are introduced into a reaction vessel and carbon dioxide is passed in. 13.35 l of carbon dioxide (0.6 mol) are taken up within 45 minutes. A very highly viscous, thixotropic paste without any crystalline components is obtained on cooling.

EXAMPLE 8 (COMPARISON EXAMPLE)

8.1

Carbon dioxide is introduced into a solution of 50 g of isophorone diamine (0.29 mol), 5 g of water (0.28 mol) and 150 ml of diethylether. A crystalline, colorless precipitate begins to form after a short time and its formation increases as carbon dioxide continues to be introduced. The precipitate is suction filtered, washed with diethylether and dried. It melts with decomposition at 134° to 137° C.

8.2

Carbon dioxide is introduced into a solution of 50 g of a mixture of 80% of 1-methyl-2,4-diamino- and 20% of 1-methyl-2,6-diaminocyclohexane (0.39 mol), 5 g of water (0,28 mol) and 150 ml of methanol. A crystalline, colorless precipitate begins to form after a short time and its formation increases as carbon dioxide continues to be introduced. This precipitate is suction filtered, washed with diethylether and dried. It melts at 140° to 143° C. with decomposition.

8.3

Carbon dioxide is introduced into a solution of 50 g of 3,3'-dimethyl-4,4'-diamino-dicyclohexylmethane (0.21 mol), 5 g of water (0.28 mol) and 150 ml of chlorobenzene. A crystalline, colorless precipitate begins to form after a short time and its formation increases during further introduction of carbon dioxide. This precipitate is suction filtered, washed with diethylether and dried. It melts at 142° to 150° C. with decomposition.

EXAMPLE 9

500 g of 1,6,11-triamino-undecane (2.487 mol), 45 g of a reaction product of ethylenediamine and propylene oxide in a molar ratio of 1:1 (0.43 mol), 150 g of water (8.33 mol) and 2 l of ethanol are introduced into a reaction vessel. Carbon dioxide is introduced at a reaction temperature of 30° to 40° C. maintained by external cooling with an ice bath until the uptake of carbon dioxide has virtually ceased. After removal of the volatile constituents by distillation (at 70° C./20 mbar) a transparent, highly viscous oil remains behind. A 50% solution in isopropanol is clear, with a viscosity of 39,000 mPas at 50° C., and does not thicken until after 6 months storage. 50 g of the isopropanol solution evolve 1.5 l of carbon dioxide after the addition of excess 50% sulphuric acid.

EXAMPLE 10

364 g of bis-(4-aminocyclohexyl)-propane-(2,2) (1.53 mol), 832 g of N-(β-hydroxyethyl)-ethylenediamine (8.00 mol) and 180 g (10 mol) of water are introduced into a reaction vessel and gassed with carbon dioxide at a reaction temperature not exceeding 30° C. (external cooling). $CO_2$ continues to be introduced until it virtually ceases to be taken up. The initially low viscosity composition thickens after one week to about 100,000 mPas/23° C. but shows no signs of crystalline components at this stage. 50 g of the carbonic acid composition evolve 7.4 l of carbon dioxide when excess 50% sulphuric acid is added.

EXAMPLE 11

1178 g of bis-(3-methyl-4-aminocyclohexyl)-methane (4.95 mol), 705 g of N-(β-hydroxyethyl)-ethylenediamine (6.78 mol), and 123 g of water (6.83 mol) are introduced into a reaction vessel. 76 l of $CO_2$ (3.39 mol) are taken up within 20 minutes at a temperature rising from 20° C. to 62° C. Two hours after termination of the introduction of $CO_2$, the reaction mixture, which is at that stage still a highly fluid reaction mixture, is diluted with 585 g of i-butanol. 50 g of the whole mixture release 1.4 l of carbon dioxide after the addition of excess 50% sulphuric acid. The product mixture prepared as described is more highly fluid at every temperature than the products according to Examples 1, 2 and 3. It does not thicken even after 6 months storage, shows no formation of crystalline deposits and is phase stable.

EXAMPLE 12

345 g of 3,3',5,5'-tetraethyl-4,4'-diamino-dicyclohexylmethane (1.07 mol), 118 g of a reaction product of propylene diamine and ethylene oxide in a molar ratio of 1:1 (1 mol) and 56.6 g (3.14 mol) of water are introduced into a reaction vessel and treated with 62 g of carbon dioxide at 23° to 30° C. with external cooling until the rate of absorption of carbon dioxide has become very low. A clear carbonic acid salt composition of medium viscosity (19,000 mPas/23° C.) is obtained. It shows no signs of thickening, deposition of crystalline components or phase separation after 6 months storage. 50 g of the carbonic acid salt composition evolve 4.0 l of carbon dioxide after the addition of excess 50% sulphuric acid.

EXAMPLE 13

1997 g of 3,3'-dimethyl-4,4'-diamino-dicyclohexylmethane (8.39 mol), 1280 g of a crude reaction product of ethylene diamine and ethylene oxide (molar ratio 1:1) containing 6.4% water, 10.2% ethylenediamine, 51.4% of the monoethoxylation product, 12.3% of the diethoxylation product, and 19.6% of the triethoxylation product, and 127 g of water (7.06 mol) are introduced into a reaction vessel. 98.6 liters (4.40 mol) of carbon dioxide are taken up within 45 minutes at a reaction temperature of 50° to 80° C. After 3 hours, 950 g of isobutanol are stirred into the clear, low viscosity mixture. The product mixture, which is highly viscous at room temperature and readily fluid at 50° C., does not thicken after half a year's storage, shows no signs of crystalline deposits and evolves 1.5 l of carbon dioxide from 50 g after the addition of excess 50% sulphuric acid.

EXAMPLE 14

Comparison between carbonate and carbamate formation (1) Carbonate of ethylenediamine (according to the invention in the presence of water)

120 g of ethylenediamine (2 mol), 72 g of water (4 mol) and 500 ml of methanol are introduced into a reaction vessel and treated with carbon dioxide until saturation point at a reaction temperature of at the most 30° C. with external cooling. The product crystallizes shortly after the introduction of carbon dioxide is stopped. It is suction filtered, washed with 50 ml of methanol and dried at 23° C./20 mbar. 180 g of a colorless, crystalline product are obtained. Melting point: 161°–165° C. (with decomposition).

Evolution of gas from 50 g of substance after the addition of excess 50% sulphuric acid: 11.85 l of $CO_2$.

Theoretical evolution of gas from 50 g:

| | |
|---|---|
| $H_2NCH_2CH_2NH_2.CO_2$ | 10.77 l (m. wt.: 104) |
| $H_2NCH_2CH_2NH_2.2CO_2$ | 15.1 l (m. wt.: 148) |
| $H_2NCH_2CH_2NH_2.H_2O.CO_2$ | 9.18 l (m. wt.: 122) |
| $H_2NCH_2CH_2NH_2.H_2O.2CO_2$ | 13.5 l (m. wt.: 166) |
| $H_2NCH_2CH_2NH_2.2H_2O.2CO_2$ | 12.17 l (m. wt.: 184)* |

*most probable composition

| Solvent | Solubility tests: (carbonate) | | |
|---|---|---|---|
| | 23° C. | 80° C. | Reflux Temperature |
| Water (Bp. 100° C.) | ++ | ++ | ++ |
| Dimethylformamide (Bp. 153° C.) | − | − | − |
| Dioxane (Bp. 101° C.) | − | − | − |
| i-butanol (Bp. 108° C.) | − | − | + |

−no solubility
+moderate solubility
++good solubility (2) Carbamate of ethylenediamine (without water)

120 g of ethylenediamine (2 mol) (dehydrated over KOH and distilled) are introduced into 500 ml of anhydrous methanol and gassed with carbon dioxide until saturated. The methanol boils in spite of external cooling. The product crystallizes on cooling and is filtered off, washed with 50 ml of methanol and dried at 23° C./20 mbar. 174 g of a colorless, crystalline product is obtained.

The mother liquor was not worked up. Melting point sintering from 100° C., decomposition point 160° C.

Evolution of gas from 50 g of substance on addition of excess 50% sulphuric acid: found 10.6 l of $CO_2$.

Theoretical evolution of gas from 50 g:

| | |
|---|---|
| $H_2CH_2CH_2NH_2.CO_2$ | 10.77 l (m. wt.: 104)* |
| $H_2NCH_2CH_2NH_2.2CO_2$ | 15.1 l (m. wt.: 148) |
| $H_2NCH_2CH_2NH_2.H_2O.CO_2$ | 9.18 l (m. wt.: 122) |
| $H_2NCH_2CH_2NH_2.H_2O.2CO_2$ | 13.5 l (m. wt.: 166) |
| $H_2NCH_2CH_2NH_2.2H_2O.2CO_2$ | 12.17 l (m. wt.: 184) |

*most probable composition

| Solvent | Solubility tests (carbamate) | | |
|---|---|---|---|
| | 23° C. | 100° C. | Reflux Temperature |
| Water | + | + | + |
| Dimethylformamide | − | ++ | ++ |
| Dioxane | − | + | + |
| i-butanol | − | ++ | ++ |

EXAMPLE 15

(Comparison carbonate/carbamate formation)

(1) Carbonate (in the presence of water)

250 g of hexamethylenediamine (2.16 mol), 77.7 g of water (4.32 mol) and 500 ml of methanol are introduced into a reaction vessel and carbon dioxide is passed through to saturation point (90 minutes) at a reaction temperature of maximally 30° C. (external cooling). Precipitation of carbonic acid salt begins shortly after the onset of the reaction and intensifies during the introduction of gas. The crystalline, colorless deposit is suction filtered, washed with 100 ml of methanol and dried at 23° C./20 mbar. 300 g of product are obtained; mother liquor and wash water are not worked up. Melting point: 158°–165° C., evolution of gas from 50 g of substance on the addition of excess 50% sulphuric acid: found 8.14 l of $CO_2$.

Theoretical evolution of gas from 50 g:

| | |
|---|---|
| $H_2N\text{-}(CH_2)_6\text{-}NH_2.CO_2$ | 7.0 l (m. wt.: 160) |
| $H_2N\text{-}(CH_2)_6\text{-}NH_2.2CO_2$ | 10.98 l (m. wt.: 204) |
| $H_2N\text{-}(CH_2)_6\text{-}NH_2.H_2O.CO_2$ | 6.29 l (m. wt.: 178) |
| $H_2N\text{-}(CH_2)_6\text{-}NH_2.H_2O.2CO_2$ | 10.0 l (m. wt.: 224) |
| $H_2N\text{-}(CH_2)_6\text{-}NH_2.2H_2O.2CO_2$ | 8.42 l (m. wt.: 266)* |

*most probable composition

| | Solubility tests (Carbonate) | | |
|---|---|---|---|
| Solvent | 23° C. | 80° C. | Reflux Temperature |
| Water | ++ | ++ | ++ |
| Dimethylformamide | − | + | + |
| Dioxane | − | − | − |
| i-butanol | − | + | + |

(2) Carbamate (without water)

250 g of hexamethylenediamine (2.16 mol) and 500 g of methanol are introduced into a reaction vessel and gassed with carbon dioxide until saturation point is reached. The methanol begins to boil in spite of external cooling with an ice bath. The product does not begin to crystallize until it cools. It is suction filtered, washed with 100 ml of methanol and dried at 23° C./20 mbar. Mother liquor and washing solution are not worked up. 316 g of a colorless, crystalline product having a melting point of 163° C. preceded by sublimation or decomposition are obtained. Evolution of gas from 50 g of substance on the addition of excess 50% sulphuric acid: found 7.3 l of $CO_2$. When comparing this result with the theoretical evolution of gas from various compositions (see above), the most probable composition is found to be $NH_2\text{—}CH_2\text{—}_6NH_2.CO_2$.

| | Solubility tests (carbamate) | | |
|---|---|---|---|
| Solvent | 23° C. | 80° C | Reflux Temperature |
| Water | + | + | + |
| Dimethylformamide | + | ++ | ++ |
| Dioxane | − | + | + |
| i-butanol | − | ++ | ++ |

These examples show that the carbonic acid adducts (carbonates and carbamates) obtained by the reaction of carbon dioxide with ethylene diamine and 1,6-diaminohexane with or without the presence of water differ distinctly from one another both analytically and in their solubility properties.

EXAMPLES OF PRACTICAL APPLICATION

EXAMPLE 16

Use of a coating composition according to the invention for producing an intermediate coat and a bonding coat (a) Top coat of one-component polyurethane (not according to the invention)

A 25% solution of a polycarbonate-polyester urethane in dimethylformamide having a viscosity of 10,000 mPas/25° C. is used to produce the top coat. It is prepared by solvent-free condensation of 1000 g (0.5 mol) of hexanediol polycarbonate, 1125 g (0.5 mol) of a butane-1,4-diol adipate, 270 g (3.0 mol) of butane-1,4-diol and the equivalent quantity of 4,4'-diisocyanato-diphenylmethane. The solution of the aromatic one-component polyurethane in dimethylformamide is pigmented with 8% of a commercial pigment paste, Bayderm-Schwarz-C-TO, BAYER-AG, D-5090 Leverkusen. The pigmented top coat solution is applied to a separating paper (wet application 120 g/m²) on a coating machine using an applicator roller with doctor knife. The dimethylformamide which evaporates during the passage through the first channel is taken to a recovery plant.

(b) Intermediate coat (according to the invention)

At the second coating apparatus, a pot blown foam paste is applied as intermediate coat in a quantity of 160 g/m². The foam paste compounded on the basis of blocked isocyanate prepolymers is cross-linked with a cross-linking mixture according to Example 1 and foamed up.

Composition of the pot foam paste:

An isocyanate prepolymer blocked with butanone oxime is prepared from 2000 g (1.0 mol) of a polyether of propylene oxide, 1000 g (0.5 mol) of a polyester of hexane-1,6-diol/neopentyl glycol (mol proportion 65:35) and adipic acid, 775 g (3.1 mol) of 4,4'-diisocyanatodiphenylmethane and 261 g (3.0 mol) of butanone oxime in 450 g of methyl glycol acetate, 89.5 parts of blocked isocyanate prepolymer, 0.5 parts of a silicone as foam stabilizer, Imprafix 43053-flüssig- BAYER-AG-D-5090 Leverkusen, 10 g of talcum, 5 g of pigment paste as described in (a) and 7.3 g of a crosslinking mixture according to Example 1. The intermediate coat is placed in a second channel for foaming it and at the same time cross-linking it, where it is kept at 120°–140°–160° C. for a total dwell time of approximately 90 to 180 seconds and thus dried. The foam obtained as intermediate coat for building up the coating has a unit weight of about 600 g/l.

(c) Bonding coat (according to the invention)

The paste of pot blown foam described above which is also used as intermediate coat is here used as bonding coat which is applied to the intermediate coat in a quantity of 60 g/m², subjected to a preliminary reaction in a first passage through a channel at 135° C. and then cross-linked at 150° to 160° C. after it has been laminated to a cotton fabric.

EXAMPLE 17

Use of a coating composition according to the invention for the production of an intermediate coat and a bonding coat (a) Top coat (not according to the invention)

The top coat is prepared from a 90% high-solid-PUR of a blocked isocyanate prepolymer having an isocyanate content of 3.3% prepared according to European Patent Application 13,890 where it is described as prepolymer (B). The top coat paste consists of 1280 g of the blocked isocyanate prepolymer, 119 g of 3,3'-dimethyl-4,4'-diaminodicyclo-hexylmethane, 140 g of a commercial pigment paste, as described in example 16(a), 3 g of polydimethylsiloxane oil (Baysilon OF-OH 502, BAYER-AG, D 5090 Leverkusen), and 30 g of silicate filler, (Aerosil 380, DEGUSSA, D-6000 Frankfurt). The coating paste (4000 mPas/20° C.) is applied to a separating paper in an amount of 70 g/m² using a roller applicator with doctor knife and is hardened in a drying channel at 140° to 160° C. for 2 minutes.

(b) Intermediate coat (according to the invention)

200 g/m² of an intermediate coat consisting of pot blown foam paste are applied with doctor knife in the second coating apparatus. The foam paste compounded on the basis of the blocked isocyanate prepolymer described in Example 16 is cross-linked with the cross-linking mixture according to Example 3 and spread coated.

Composition of the pot foam paste 89.5 parts of blocked isocyanate prepolymer having an isocyanate content of 3.0% prepared according to Example 16, 0.5 parts of silicone oil as described in example 16(b) as foam stabilizer, 10 parts of talcum and 5 parts of pigment paste of example 16a) and 9.4 parts of the reaction mixture according to Example 2 as cross-linking agent and blowing agent.

The temperatures employed for the blowing and cross-linking reaction of the foam are as indicated in Example 16. The unit weight is 625 g/l.

(c) Bonding coat (according to the invention)

The pot blown foam paste described above which was also used for the intermediate coat is used here as bonding coat. The substance is worked up as described in Example 16.

EXAMPLE 18

Use of a coating composition according to the invention for the production of an intermediate coat and a bonding coat (a) Top coat (not according to the invention)

The top coat is produced from a pigmented 30% solution of an aliphatic one-component polyester urethane in toluene/isopropanol/ethylene glycol=29:29:12 having a viscosity of 22,000 mPas/25° C. The polyurethane is synthesized by the reaction of an isocyanate prepolymer of 1700 g (1 mol) of a polyester prepared from hexane-1,6-diol, neopentyl glycol (65/35 mol %) and adipic acid and 490 g (2.2 mol) of isophorone diisocyanate with 205 g (1.2 mol) of isophorone diamine in solution. The intermediate coat and bonding coat are formed as in Example 16.

EXAMPLE 19

Use of a blown foam paste according to the invention as bonding coat (a) Top coat (not according to the invention)

The top coat is prepared from a 30% solution of a polyester urethane in dimethylformamide/methyl ethyl ketone (1:1) having a viscosity of 30,000 mPas/25° C. The polyester urethane consists of 1800 g (2 mol) of a butane-1,4-diol adipate, 174 g (1 mol) of tolylene diisocyanate, 186 g (3 mol) of ethylene glycol and the equivalent quantity of 4,4'-diisocyanatodiphenylmethane (1000 g). After the composition has been pigmented (6% of the pigment paste of example 16(a), it is applied to a separating paper under known conditions to produce a top coat with a solid content of 30 g/m$^2$.

(b) Intermediate coat (not according to the invention)

200 g/m$^2$ of a pot blown foam paste of 1280 g of a blocked isocyanate prepolymer (preparation according to EP-A 13,890, see Prepolymer (B), 119 g of 3,3'-dimethyl-4,4'-diamino-dicyclohexlmethane, 20 g of diphenyl-3,3'-disulphonic hydrazide, 3.0 g of dimethyl-polysiloxane as described in example 16(b), and 70 g of silicate filler, as described in example 17(a) are applied as intermediate coat by knife coating. The temperatures employed for the blowing and cross-linking reactions of the foam in its passage through the channel (about 2 to 3 minutes) are 120°–150°–170° C. The cross-linked foam has a unit weight of 500 g/l.

(c) Bonding coat (according to the invention)

The bonding coat (60 g/m$^2$) consists of a pot blown foam to which the textile substrate is laminated by the dry laminating process according to Example 16. The said foam has the following composition: 89.5 parts of blocked isocyanate prepolymer prepared according to Example 16(b), 0.5 parts of a silicone, as described in example 16(b), as foam stabilizer, 10 parts of talcum, 5 parts of pigment paste of example 16(a), and 9.4 parts of a cross-linking mixture according to Example 4.

When the cross-linking mixture according to Example 4 is replaced by 9.4 g of cross-linking mixture according to Example 11, the properties obtained were substantially similar.

EXAMPLES 20,21

Use of a blown foam composition according to the invention as bonding coat

The cross-linking mixture according to Example 4 used in Example 19(c) was successfully replaced by 10.2 g of cross-linking mixture prepared according to Example 9 and 7.3 g of cross-linking mixture prepared according to Example 10.

EXAMPLE 22

Use of a coating composition to the invention as bonding coat or intermediate coat (a) Top coat (not according to the invention)

The top coat is produced from a thickened, pigmented 40% PUR dispersion in water. 1700 g (1 mol) of a copolyester of hexane-1,6-diol, neopentyl glycol (65/35 mol%) and adipic acid are reacted with 303 g (1.8 mol) of hexane-1,6-diisocyanate and 152 g (0,8 mol) of the sodium salt of ethylene diamine-ethyl sulphonic acid as chain lengthening agent to produce the polyester urethane urea.

(b) Bonding coat (according to the invention)

80 g/m$^2$ of pot blown foam paste according to Example 19(c) in addition containing 2.0 g of highly dispersed silicate of example 17(a) is used as bonding coat. The textile web is incorporated by lamination without preliminary reaction of the bonding coat which is subsequently reacted in its passage through the channel at 120°–150°–170° C.

EXAMPLE 23

Use of a coating composition according to the invention as top coat and as bonding coat without intermediate coat The pot blown foam paste according to Example 16(b) is applied with doctor knife to an impregnated separating paper to form on it a layer of 80 g/m$^2$, and is cross-linked at 120°–150°–170° C. The same coating paste is then used to apply on this "foam top coat" a bonding coat in a thickness corresponding to 60 g/m$^2$, which is then laminated with a textile substrate by the dry laminating process according to Example 16.

EXAMPLE 24

Pot blown foam paste having the composition according to Example 16(b) is applied by doctor knife coating to an impregnated separating paper to form thereon a layer of 100 g/m$^2$, and this is then laminated with a textile web by the dry laminating process according to Example 16. Preliminary reaction: 135° C., cross-linking reaction after laminating: 150°–160° C.

EXAMPLE 25

(a) Bonding coat (according to the invention)

A polyester fabric weighing ca. 200 g/m² is primed with a pot blown foam paste which was used as bonding coat in Example 19(c). Application: 70 g/m², cross-linking temperature in the channel: increasing 120°-150°-170° C.

(b) Top coat (not according to the invention)

After priming, a compact high-solid-PUR layer is applied by knife coating in a thickness of 120 g/m². Cross-linking: 120°-150°-170° C. The coating paste has the following composition: 1000 g of blocked isocyanate prepolymer having an isocyanate content of 3.3% prepared according to EP-A 13,890, prepolymer (B), 5,0 g of a silicone(Levacast-fluid-S, BAYER-AG-5090 Leverkusen), and 10 g of a polyacryate levelling agent (Acronal 7002, BASF-AG, Ludwigshafen/Rhein). 15 g of a commercial pigment paste of example 16(a) and 90 g of 3,3'dimethyl-4,4'-diamino-dicyclohexylmethane as cross-linking agent.

EXAMPLE 26

Use of a pot foam composition according to the invention as intermediate coating paste (a) Top coat (not according to the invention)

The polyurethane solution described in Example 16(a) is used to produce a top coat film with a solid content of 30 g/m² on a separating paper.

(b) Intermediate coat (according to the invention)

200 g/m² of a pot blown foam paste is applied as intermediate coat to the aforesaid top coat by doctor knife coating. Composition of foam paste: 89.5 parts of blocked isocyanate prepolymer as described in Example 16(b) having a isocyanate content of 3.0%, 0.5 parts of silicone as foam stabilizer, as in example 16(b), 10 parts of talcum and 5 parts of pigment paste, as in example 16(a), 9.4 parts of reaction mixture according to Example 12 as cross-linking agent and blowing agent.

Temperatures employed for blowing and cross-linking the foam: 120°-140°-160° C., dwell time in the channel: 90 seconds.

7.7. of cross-linking blowing agent according to Example 13 was used instead of 9.4 g cross-linking blowing agent according to Example 12. The unit weights are about 650 g/l.

(c) Bonding coat (not according to the invention)

The bonding coat used is a 35% polyurethane solution in dimethylformamide/methyl ethyl ketone/toluene (30:30:40), the polyurethane consisting of 2000 g of a polyester of polypropylene oxide, 780 g of diisocyanatodiphenylmethane and 108 g of butane-1,4-diol.

The bonding coat is applied with a wet application of about 120 g/m² to the foamed intermediate coat by doctor knife coating. Pieces of split leather are placed with light pressure onto the wet bonding coat and the solvent mixture is evaporated by circulating air at 80° to 90° C. The dressed split leather has an excellent grain and handle.

EXAMPLES OF PRACTICAL APPLICATION WITH ISOCYANATE PREPOLYMERS WHICH ARE NOT BLOCKED

EXAMPLE 27

0.3 parts of dibutyl tin dilaurate and 0.6 parts of diazabicycloundecane are dissolved in 5 parts of the product from Example 7 (OH number 1245). This mixture is added to 115 parts of an isocyanate prepolymer which has an isocyanate content of 4% and has been prepared from isophorone diisocyanate and a polypropylene glycol having an average molar mass of 2000. The mixture is vigorously stirred for 30 seconds with a high speed stirrer (index 100, i.e. equivalent quantities of NCO/chain lengthening agent).

The freely expanded foam has a cream time of about 60 seconds and is hardened by 10 minutes tempering at 80° C. The foam, which has little elasticity, has a uniform pore structure and good tear propagation resistance.

EXAMPLE 28

0.3 parts of dibutyl tin dilaurate and 0.6 parts of diazabicycloundecene are dissolved in 5 parts of the product from Example 13 (OH number 1052) obtained before mixing with isobutanol. The resulting mixture is added to 98 parts of the above-mentioned isocyanate prepolymer and vigorously mixed for 50 seconds, using a high speed stirrer at room temperature. The freely expanded foam has a cream time of 75 seconds and is hardened for 10 minutes at 80° C. The soft foam has no residual tackiness and it has satisfactory elasticity and very good tear propagation resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Non-crystalline, liquid or fluid polyamine/carbonic acid salt compositions from polyamines and $CO_2$, which are prepared by mixing
   (1) aliphatic or cycloaliphatic polyamines having primary and/or secondary amino groups,
   (2) aliphatic or cycloaliphatic hydroxyamines having at least one hydroxyl group and at least one amino group
   in quantitative proportions of (1) to (2) of from about 95:5 to 10:90% by weight, optionally
   (3) diluents in the form of organic solvents having a boiling point below about 160° C. and at least partial solubility in water, in quantities of up to about 90% of solvent in the total mixture of (1) to (6), and optionally
   (4) auxiliary agents and additives with
   (5) from about 0.01 mol to 5 mol of water per amine equivalent, wherein the quantity of water must be at least 1 mol of water per mol of $CO_2$, and subsequently
   (6) adding sufficient $CO_2$ to incorporate from about 0.01 to 0.99 mol of $CO_2$ per amine equivalent.

2. The polyamine/carbonic acid salt compositions according to claim 1, characterized in that they contain aliphatic or cycloaliphatic polyamines having from 2 to 4 primary amino groups.

3. The compositions according to claim 2, characterized in that they contain mono- to tris-hydroxyalkyl-polyamines as hydroxyamines (2).

4. The compositions according to claim 2 or 3, characterized in that the compositions contain the polyamines (1) and hydroxyamines (2) in proportions in the range of from about 80:20 to 25:75% by weight.

5. The compositions according to claim 2 or 3 which comprise using from about 0.1 to 1.0 mol of water per amine equivalent.

6. The compositions according to claim 2 or 3 which comprise adding sufficient $CO_2$ to incorporate from about 0.05 to 0.8 mol of $CO_2$ per amine equivalent.

7. A process for the preparation of non-crystalline, liquid or fluid polyamine/carbonic acid salt compositions from polyamines and $CO_2$ which comprises mixing
   (1) aliphatic or cycloaliphatic polyamines having primary and/or secondary amino groups,
   (2) aliphatic or cycloaliphatic hydroxyamines having at least one hydroxyl group and at least one amino group
in proportions of (1) to (2) of from about 95:5 to 10:90% by weight, optionally
   (3) diluents in the form of organic solvents having a boiling point below about 160° C. and at least partial solubility in water, used in quantities of up to about 90% by weight of solvent in the total mixture of (1) to (6) and optionally
   (4) auxiliary agents and additives with
   (5) from about 0.01 to 5 mol of water per amine equivalent, the quantity of water being at least 1 mol of water per mol of $CO_2$, and subsequently
   (6) adding sufficient $CO_2$ to incorporate from about 0.01 to 0.99 mol of $CO_2$ per amine equivalent.

8. The process according to claim 7 wherein primary diamines are used as component (1) and mono- and di-($\beta$-hydroxyalkyl)-alkylene diamines are used as component (2).

9. The process of claim 7 or 8 which comprises mixing components (1) and (2) and optional components (3) and (4) with
   (5) from about 0.1 to 1.0 mol of water per amine equivalent, and subsequently
   (6) adding sufficient $CO_2$ to incorporate from about 0.1 to 0.5 mol of $CO_2$ per amine equivalent.

10. Polyurethane ureas which are optionally foamed and prepared from a reaction mixture comprising
   (A) isocyanate prepolymers with an isocyanate content of about 1 to 24% by weight having an average of from 2 to 4, optionally blocked, aromatic and/or aliphatic and/or cycloaliphatic isocyanate groups and
   (B) chain lengthening agents and/or cross-linking agents comprising at least 50 equivalent percent of the non-crystalline polyamine/carbonic acid salt compositions of claim 1, 2 or 3.

11. The polyurethane ureas of claim 10 wherein the isocyanate groups of component (A) are blocked with blocking agents for isocyanate groups and component (B) comprises 100 equivalent percent of said non-crystalline polyamine/carbonic acid salt compositions.

* * * * *